UNITED STATES PATENT OFFICE.

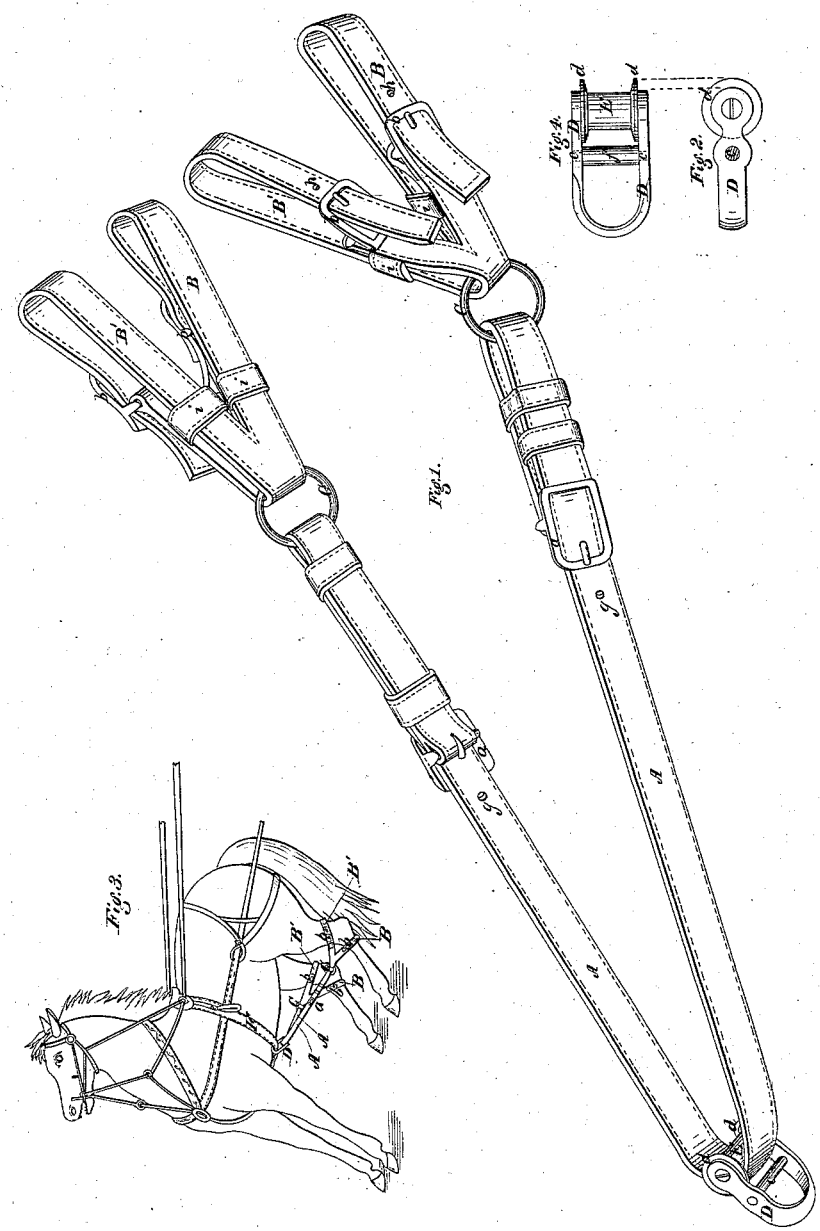

ELIJAH H. GAMMON, OF BATAVIA, ILLINOIS.

IMPROVED APPARATUS TO PREVENT HORSES FROM KICKING.

Specification forming part of Letters Patent No. 54,887, dated May 22, 1866.

*To all whom it may concern:*

Be it known that I, ELIJAH H. GAMMON, of the village of Batavia, in the county of Kane and State of Illinois, have invented a certain new and Improved Apparatus to Prevent Horses from Kicking, &c.; and I do hereby declare that the following is a full, clear, and exact description thereof, reference being had to the accompanying drawings, making a part of this specification, in which—

Figure 1 is a view of the apparatus detached; Fig. 2, a top view of the belt attachment; Fig. 4, a side view of the same, and Fig. 3 a side view of the apparatus as attached to a horse.

Like letters refer to similar parts in all of the figures.

The nature and object of my invention consist in constructing and attaching to a horse a series of straps, which I call a "kicking-rig," so as to prevent the horse from kicking, running, rearing, or leaping, and so as not to interfere with or impede it in walking or trotting; in connecting this rig with the belt, surcingle, or breast-strap by means of the belt attachment, Fig. 4; in the arrangement and construction of the straps connected with the belt, with the arrangement and location of the straps attached to the legs of the horse, and in the combination hereinafter shown and claimed.

To enable others skilled in the art to make and use my invention, I will proceed to describe its construction and operation.

The strap A is made about six feet in length and about two inches in width. Exact length is not material, as the strap is brought through the rings C C at each end, the extreme ends being furnished with the buckles a, and its length adjusted to the size of the horse by the buckles a and the holes g. For ease of motion this strap should not be drawn up quite as close as shown at Fig. 3, but so adjusted that the horse when standing will stand in its natural position.

The straps B and B' are usually made of one piece, but separated at a point near the ring, as shown, and are about twenty-four inches in length and half the width of the strap A. Their length is adjusted by the slides i, and fitted to the legs of the horse by the buckles b and holes h.

The strap A is attached to the horse or harness by means of the belt attachment, Fig. 4, which is made of iron, brass, or other suitable material, and the bow D bent in the form shown, and at the ends of the bow I insert a friction-roller, E, which is provided with flanges d, a little wider than the thickness of the strap A. These flanges prevent the strap from getting down onto the bow D, so as to fret and wear the edges of the strap A and remove any friction which might thereby be caused. Immediately in front of these flanges, or near enough to them to prevent the strap from getting down, I place pin c, Fig. 1, or roller f, Fig. 4. If the pin c is used it will be well to cover it with a revolving sheath.

The strap A passes around the roller E, and is kept in by f. The belt or girth of the harness passes through the bow D in front of f, as does also the strap from the collar or breast-strap when used. When the horse is not in harness it may be directly attached to the breast-strap or to a belt or surcingle.

When this apparatus is attached to a horse it will not interfere with his regular movements, as the strap plays with perfect ease through the rollers E, and its rigidity is overcome by the introduction of the rings C, so that it does not fret or injure the horse, and it can walk or trot with as much freedom as though this apparatus was not attached to it.

It will be evident that the horse cannot use both hind feet at once, so that it cannot jump, run, or kick, nor can it kick with one foot, as that throws the other forward.

This apparatus will also be found effectual in curing such horses as have a habit of kicking the stable, and is valuable as a hopple, as, being attached to the gambrel instead of the fetlock, it is not liable to be wet by the night dews.

In attaching it to the legs of the horse the straps B are placed immediately below the gambrel-joints, and the straps B' above, as shown, and for this reason the rings C are important, as they permit the natural use of such joint without injury to the horse.

Having thus fully described my apparatus, what I claim as my invention, and desire to secure by Letters Patent, is—

The device to prevent horses from kicking, &c., constructed substantially as herein described, as a new article of manufacture.

ELIJAH H. GAMMON.

Witnesses:
L. L. BOND,
E. A. WEST.